US 6,749,920 B1

(12) United States Patent
Caldwell et al.

(10) Patent No.: US 6,749,920 B1
(45) Date of Patent: *Jun. 15, 2004

(54) HIGH SOLIDS, LOW SHRINKAGE COATING

(75) Inventors: Kenneth G. Caldwell, Mountville, PA (US); James L. Work, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/030,876

(22) Filed: Feb. 26, 1998

Related U.S. Application Data

(63) Continuation of application No. 08/949,370, filed on Oct. 14, 1997, now Pat. No. 5,869,166, which is a continuation-in-part of application No. 08/747,233, filed on Nov. 12, 1996, now abandoned.

(51) Int. Cl.[7] .............................. B32B 5/24; B32B 5/28; B32B 27/30; B32B 27/36; B32B 27/38
(52) U.S. Cl. ...................... 428/105; 428/109; 428/113; 428/323; 428/327; 428/328; 428/330; 428/331; 428/332; 428/339; 428/411.1; 428/413; 428/423.1; 428/480; 428/421; 428/500; 428/521; 428/522; 428/904.4; 52/144; 181/287; 181/294
(58) Field of Search ................................ 106/400, 409; 428/105, 106, 107, 108, 109, 113, 142, 323, 327, 328, 330, 331, 332, 339, 411.1, 421, 423.1, 413, 480, 521, 500, 524, 904.4, 526; 524/425, 427, 446, 449, 493, 451, 522, 524; 427/221, 421; 181/287, 294; 52/144

(56) References Cited

U.S. PATENT DOCUMENTS

| | | | | |
|---|---|---|---|---|
| 2,411,470 A | | 11/1946 | Patton ......................... 260/41 |
| 4,221,697 A | | 9/1980 | Osborn et al. ........... 260/42.53 |
| 4,413,026 A | | 11/1983 | Sherno .................... 427/407.1 |
| 4,456,507 A | | 6/1984 | Kivel et al. .............. 204/181 T |
| 4,472,540 A | * | 9/1984 | Barker ....................... 523/220 |
| 4,537,926 A | * | 8/1985 | Kivel et al. ................. 524/388 |
| 4,559,377 A | | 12/1985 | Gleason et al. ............... 524/44 |
| 4,735,027 A | | 4/1988 | Evans et al. .................. 52/410 |
| 5,054,959 A | * | 10/1991 | Wilson et al. ................ 404/94 |
| 5,071,511 A | * | 12/1991 | Pittman ..................... 162/145 |
| 5,130,184 A | * | 7/1992 | Ellis .......................... 428/245 |
| 5,134,179 A | * | 7/1992 | Felegi, Jr. et al. ............ 524/13 |
| 5,294,459 A | * | 3/1994 | Hogan et al. ................. 427/96 |
| 5,543,207 A | * | 8/1996 | Heighington et al. ....... 428/207 |
| 5,869,166 A | * | 2/1999 | Caldwell et al. ............ 428/142 |
| 6,207,742 B1 | * | 3/2001 | Boldt ......................... 524/494 |

FOREIGN PATENT DOCUMENTS

| | | | |
|---|---|---|---|
| EP | A-0409459 | * | 1/1991 |
| GB | 1015704 | | 1/1966 |
| WO | WO 9321995 A | * | 11/1993 |
| WO | WO96/24640 | * | 8/1996 |

* cited by examiner

Primary Examiner—Paul Thibodeau
Assistant Examiner—Ramsey Zacharia
(74) Attorney, Agent, or Firm—Womble Carlyle Sandridge & Rice, PLLC

(57) ABSTRACT

Using a combination of relatively coarse filler and latex binder, a high solids coating which has a minimum solids content of about 60% by volume, can be produced with a relatively low working viscosity. These very high solids coatings can be applied in thick single layers and oven cured without cracking. They maintain more than 80% of their original wet thickness. The resulting coating provides an extremely hard and durable surface, even on relatively soft mineral fiber board ceiling tiles or wall panels.

34 Claims, No Drawings

HIGH SOLIDS, LOW SHRINKAGE COATING

This application is a continuation-in-part of U.S. Ser. No. 08/949,370 U.S. Pat. No. 5,869,166 filed Oct. 14, 1997, entitled "High Solids, Low Shrinkage Coating", which was a continuation-in-part of U.S. Ser. No. 08/747,233 filed Nov. 12, 1996, entitled "High Solids, Low Shrinkage Coating", now abandoned.

BACKGROUND OF THE INVENTION

Field of the Invention

The invention is a coating, particularly useful for ceiling panels. Advantageously, the coating can be sprayed onto the panel, and furthermore, can be put on and dried to obtain a substantially thick coating without cracking.

U.S. Pat. No. 4,456,507 discloses a method of applying aqueous chip resistant coating compositions. The composition includes a film forming latex binder and a filler mixed with the binder to form a composition having a viscosity of at least 5,000 centipoise. Preferably, the chip resistant coating will be applied by spraying techniques, and the coating will preferably have a binder:filler ratio ranging from 10 to 90% binder:90–10% filler and will exhibit a viscosity of at least 10,000 centipoise. Calcium carbonate may be used as a filler. The coating has an extremely high solid content (70–90%).

U.S. Pat. No. 4,413,026 discloses a composition for coating surfaces such as roofs and the like. The composition includes about 40 to 80% by volume of particles of polystyrene foam plastic particles, in a mixture with about, correspondingly, 60 to 20% by volume of an aqueous synthetic. resin latex. Example I shows use of ground limestone as a filler. Shrinkage due to evaporating is usually much less than 10%. A final blend is coated on a roof at a thickness of 0.25".

U.S. Pat. No. 4,559,377 discloses a ceiling board coating. The coating includes about 10 to 30, preferably 15.3, weight percent acrylic latex. The coating also includes one or more particulate fillers selected from a, group consisting of clay, such as 200–300 mesh smectite clay, or calcium carbonate having a particle size up to 12 microns. The coating can be applied through a brush or through a small orifice nozzle.

U.S. Pat. No. 4,221,697 discloses stable, fluid, moldable and curable compositions from which may be fabricated composite materials. The fluid compositions comprise a polymerizable organic liquid having a viscosity not greater than 50 poise at molding temperature and inorganic filler particles constituting at least 20% by volume and, optionally, up to 90% by volume.

U.S. Pat. No. 4,735,027 is merely noted for disclosing a coating for wallboard which does not crack or shrink as it drys.

SUMMARY OF THE INVENTION

Using a relatively coarse filler (average particle size about 75 to about 350 microns) together with a latex binder, a very high solids coating which is at least about 60% by volume in solids (about 80% by wt. or higher) can be made with a relatively low working viscosity (up to about 5,000 cps or less). Although thicknesses as low as about 1 mil can be used, these very high solids coatings can preferably be applied to obtain thick single layers (from about 0.010 to about 0.050 inches or even thicker) and oven cured without mudcracking (cracking due to shrinkage). These very high solids coatings can be applied in thick single layers. Acceptably the coatings can be from:about 1 to about 125 mils thick, and preferably it is in the range of from about 10 to about 75 mils thick. These coatings retain about 82% or more of their original wet. thickness upon oven curing.

This allows thick single coat applications not possible with typical lower solids coatings.

The resulting coating is extremely hard and durable. When applied to a relatively soft mineral fiber substrate, these coatings provide excellent impact resistance and abrasion resistance. Because of the relatively low working viscosity of these coatings, a number of application methods are possible, including spray coating. Furthermore, the coating can be spray coated at a low pressure of from about 10 to about 60 PSI (pounds per square inch).

DESCRIPTION OF THE INVENTION

By using a relatively coarse filler (average particle size about 75–350 microns) together with a latex binder, the coating can be given a very high solids of at least about 60% by volume in solids. The preferred range of solids in the coating is from about 60% by volume to about 70% by volume where the coating is too viscus to be applied to the board. The coating, furthermore, can be made with a relatively low working viscosity (5,000 cps or less). The viscosity can be measured at 10 rpm using the Brookfield viscometer. These very high solids coatings are uniquely capable of being applied in very thick single layers (0.010" or thicker) and cured without mudcracking. Additionally, these coatings retain about 82% or more of their original wet thickness after oven drying and curing. Typical paints lose up to 70% of original wet thickness and would show mudcracking in the thicker applications. Because of the low shrinkage character of these coatings, thicker single layers can be applied and cured without significant thickness loss or mudcracking.

In a volume percent, the coating can be up to about 40% by volume in water, preferably it is from about 15 to about 35% by volume in water. Acceptably, the coating can be up to about 18% by weight water with the balance in solids particles. Preferably the coating is from about 5 to about. 18% by weight water. The coating acceptably is from about 2 to about 50% by weight of the binder, up to about 80% by weight of filler, suitably from about 1 to about 80% by weight, (preferably from about 30 to about 80% by wt.) and from about 0 to about 5% by weight of the dispersing agent.

Acceptably, the coating is at least about 60% by volume in solids. Acceptably, the maximum amount of solids by volume is about 70%.

The solids include the binder particles and the fillers.

A variety of fillers are suitable for use with the present invention as long as the average particle size range is between 75 and 350 microns. These fillers are also typically referred to in the art as "extender particles" and "extender pigments". Foamed particles of all types can be used. A suitable filler can be'selected from the group consisting of solid polymer particles, hollow beads, foamed polymer perlite, calcium carbonate, clay, dolomite, sand, barium sulfate, mica, silica, talc, gypsum, wollastonite, calcite, aluminum trihydrate, zinc oxide, zinc sulfate and mixtures thereof. Since the fillers permitted can be hollow beads or foamed particles, the highest amount of solids permitted are best expressed as a volume percent. Preferred fillers can include calcium carbonate, dolomite clay, mica, sand, talc, or silica.

A variety of latex binders are suitable with the present invention. The latex binders can include one or more of the following monomers: vinyl acetate, vinyl propinoate, vinyl butyrate, ethylene, vinyl chloride, vinylidene chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, and an ester. Preferably the binder is selected from the group consisting of aqueous lattices of polyvinyl acetate, polyvinyl acrylic, polyurethane, polyurethane acrylic, polystyrene acrylic, epoxy, polyethylene vinyl chloride, polyvinylidene chloride, and polyvinyl chloride.

This coating can be used on fibrous ceiling boards of all types with or without a scrim. Acoustical board is preferred. Mineral fiberboard or fiberglass board can be used. When the boards have a scrim the scrim used will have two facial surfaces, one of which is the face surface of the ceiling board.

The present invention can be better understood from the examples that follow. These examples are offered to illustrate the present invention and not to limit it.

The preferred formulation is:

| Ingredient | Trademark Name | Company | Purpose | % By Weight |
|---|---|---|---|---|
| Water | | | Vehicle | 7.43 |
| Acrylic Latex* | Carbobond 26373 | B. F. Goodrich | Binder | 16.25 |
| Sodium Polyacrylate | Tamol 731 | Rohm & Haas | Dispersing Agent | 0.56 |
| Titanium Dioxide* | Tipure R-901 | Dupont Chemicals | Opacifier | 3.01 |
| Dolomite* | Dolofil 2055 | Specialty Minerals | Extender Pigment | 72.44 |
| Polyether Polysiloxane | Tego Foamex 1488 | Goldschmidt Chemical | Antifoam | 0.14 |
| Acrylic Emulsion | Acrysol TT-615 | Rohm & Haas | Thickener | 0.17 |

Solids = 85% by weight, 67% by volume
Average particle size = about 125 microns
Viscosity = 3000 cps measured by a Brookfield viscometer at 10 rpm
Thicknesses most preferred = from about 10 to about 50 mils
*Contributes solids by weight and volume. The binder has 50% by wt. solids.

In the preferred formula, a 40 mesh limestone (average particle size of about 125 microns) is combined with an acrylic latex to make an 85% by weight (67% by volume) solids coating with a 5 to 1 filler to binder ratio. The resulting coating, when applied in thicknesses of 0.010" or greater, provides an extremely hard and durable surface, even on relatively soft mineral fiber board ceiling tiles. Because of the relatively low working viscosity of the coating mixture, it can be applied a number of ways, including spray coating. Other formulations are:

| Ingredient | Trademark Name | Company | Purpose | % By Weight |
|---|---|---|---|---|
| Water | | | Vehicle | 2.06 |
| Acrylic Latex* | Carbobond 26373 | B. F. Goodrich | Binder | 17.19 |
| Sodium Polyacrylate | Tamol 731 | Rohm & Haas | Dispersing Agent | 0.59 |
| Titanium Dioxide* | Tipure R-901 | Dupont Chemicals | Opacifier | 3.19 |

-continued

| Ingredient | Trademark Name | Company | Purpose | % By Weight |
|---|---|---|---|---|
| Dolomite* | DF 3015 | Specialty Minerals | Extender Pigment | 76.64 |
| Polyether Polysiloxane | Tego Foamex 1488 | Goldschmidt Chemical | Antifoam | 0.15 |

Solids = 90% by wt. and 69% by volume
Average particle size = about 350 microns in diameter
Viscosity = 5000 cps measured by a Brookfield viscometer at 10 rpm
Most preferred thicknesses = from about 10 to about 50 mils
*Contributes solids by volume and by weight. The binder has 50% by wt. solids.

| Ingredient | Trademark Name | Company | Purpose | % By Weight |
|---|---|---|---|---|
| Water | | | Vehicle | 10.1 |
| Polyvinyl Acetate* | Vinac 521P | B. F. Goodrich | Binder | 15.77 |
| Sodium Polyacrylate | Tamol 731 | Rohm & Haas | Dispersing Agent | 0.54 |
| Titanium Dioxide* | Tipure R-901 | Dupont Chemicals | Opacifier | 2.92 |
| Calcium Carbonate* | Micro White 450 | ECC International | Extender Pigment | 70.36 |
| Polyether Polysiloxane | Tego Foamex 1488 | Goldschmidt Chemical | Antifoam | 0.14 |
| Acrylic Emulsion | Acrysol TT-615 | Rohm & Haas | Thickener | 0.17 |

Solids = 82% by wt. and 63% by volume
Average particle size = about 75 microns in diameter
Viscosity = 5000 cps measured by a Brookfield viscometer at 10 rpm
Most preferred thicknesses = from about 10 to about 50 mils
*Contributes solids by volume and by weight.

The solids are comprised of a dolomite extender pigment and acrylic latex binder.

This coating could provide very high performance ceiling tiles or wall panels with very hard and durable surfaces. Such products could potentially compete with other high performance ceilings such as metal pan. These coatings may also be good substitutes for vinyl laminates to impart durability and cleanability to ceiling tiles or wall panels. The finish can be either smooth or textured. depending on the substrate to which they are applied. Also, with the addition of small amounts of colored particles, a variegated look can be achieved.

What is claimed is:

1. A ceiling board with a coating comprising:
   (a) a fibrous ceiling board with a face surface; and
   (b) a high solids, low shrinkage coating on the face surface, said coating comprising water, a latex binder, and a total solids content of at least 60% by volume of the coating with said solids comprising particles having an average particle size in the range of from about 75 to about 350 microns, said coating being sprayable at a pressure in the range of from about 10 to about 60 PSI.

2. The board of claim 1 wherein the total solids of the coating is in the range of from about 60 to about 70% by volume.

3. The board of claim 1 wherein the fibrous ceiling board is a fiberglass board.

4. The board of claim 1 wherein the fibrous ceiling board is a mineral fiberboard.

5. The board of claim 1 wherein the coating has a thickness in a range from about 0.01 to about 0.05 inch.

6. The board of claim 1 wherein the particles are selected from solid polymer particles, hollow beads, foamed polymer particles, perlite, calcium carbonate, clay, dolomite, sand, barium sulfate, mica, silica, talc, gypsum, wollastonite, calcite, aluminum trihydrate, zinc oxide, zinc sulfate, or mixtures thereof.

7. The board of claim 1 wherein the binder is selected from vinyl acetate, vinyl propinoate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, an ester, or combinations thereof.

8. The board of claim 1 further comprising a scrim attached to the fibrous ceiling board and thereby forming the face surface.

9. A ceiling board with a coating comprising:
   (a) a fibrous ceiling board with a face surface; and
   (b) a high solids, low shrinkage coating on the face surface, wherein the coating comprises:
      water;
      a latex binder; and
      a total solids content of at least 60% by volume with said solids comprising particles having an average particle size in the range of from about 75 to about 350 microns, said composition being sprayable and having viscosities ranging up to about 5000 cps.

10. The board of claim 9 wherein the total solids of the coating is in the range of from about 60 to about 70% by volume.

11. The board of claim 9 wherein the fibrous ceiling board is a fiberglass board.

12. The board of claim 9 wherein the fibrous ceiling board is a mineral fiberboard.

13. The board of claim 9 wherein the coating has a thickness in a range from about 0.01 to about 0.05 inch.

14. The board of claim 9 wherein the particles are selected from solid polymer particles, hollow beads, foamed polymer particles, perlite, calcium carbonate, clay dolomite, sand, barium sulfate, mica, silica, talc, gypsum, wollastonite, calcite, aluminum trihydrate, zinc oxide, zinc sulfate, or mixtures thereof.

15. The board of claim 9 wherein the binder is selected from vinyl acetate, vinyl propinoate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, an ester, or combinations thereof.

16. The board of claim 9 further comprising a scrim attached to the fibrous ceiling board and thereby forming the face surface.

17. A ceiling board with a coating comprising:
   (a) a fibrous ceiling board with a face surface; and
   (b) a high solids, low shrinkage coating on the face surface, wherein the coating comprises:
      water;
      a latex binder; and
      solids comprising particles having an average particle size in the range of from about 75 to about 350 microns and including a filler being present at an amount in the range of from about 1 to about 80% by weight, said composition being sprayable at pressures in the range of from about 10 to about 60 PSI.

18. The board of claim 17 wherein the total solids content of the coating is at least about 60% by volume.

19. The board of claim 17 wherein the total solids of the coating is in the range of from about 60 to about 70% by volume.

20. The board of claim 17 wherein the fibrous ceiling board is a fiberglass board.

21. The board of claim 17 wherein the fibrous ceiling board is a mineral fiberboard.

22. The board of claim 17 wherein the coating has a thickness in a range from about 0.01 to about 0.05 inch.

23. The board of claim 17 wherein the particles are selected from solid polymer particles, hollow beads, foamed polymer particles, perlite, calcium carbonate, clay, dolomite, sand, barium sulfate, mica, silica, talc, gypsum, wollastonite, calcite, aluminum trihydrate, zinc oxide, zinc sulfate, or mixtures thereof.

24. The board of claim 17 wherein the binder is selected from vinyl acetate, vinyl propinoate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, an ester, or combinations thereof.

25. The board of claim 17 further comprising a scrim attached to the fibrous ceiling board and thereby forming the face surface.

26. A ceiling board with a coating comprising:
   (a) a fibrous ceiling board with a face surface; and
   (b) a high solids, low shrinkage coating on the face surface, wherein the coating comprises:
      water;
      a latex binder; and
      solids comprising particles having an average particle size in the range of from about 75 to about 350 microns and including a filler being present at an amount in the range of from about 1 to about 80% by weight, said composition being sprayable and having viscosities ranging up to 5000 cps.

27. The board of claim 26 wherein the total solids content of the coating is at least 60% by volume.

28. The board of claim 26 wherein the total solids of the coating is in the range of from about 60 to about 70% by volume.

29. The board of claim 26 wherein the fibrous ceiling board is a fiberglass board.

30. The board of claim 26 wherein the fibrous ceiling board is a mineral fiberboard.

31. The board of claim 26 wherein the coating has a thickness in a range from about 0.01 to about 0.05 inch.

32. The board of claim 26 wherein the particles are selected from solid polymer particles, hollow beads, foamed polymer particles, perlite, calcium carbonate, clay, dolomite, sand, barium sulfate, mica, silica, talc, gypsum, wollastonite, calcite, aluminum trihydrate, zinc oxide, zinc sulfate, or mixtures thereof.

33. The board of claim 26 wherein the binder is selected from vinyl acetate, vinyl propinoate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, an ester, or combinations thereof.

34. The board of claim 26 further comprising a scrim attached to the fibrous ceiling board and thereby forming the face surface.

* * * * *